United States Patent [19]

Johnson

[11] Patent Number: 4,871,184
[45] Date of Patent: Oct. 3, 1989

[54] GUIDE ASSEMBLY FOR A TRAILER HITCH STRUCTURE

[76] Inventor: Roy C. Johnson, 412 SW. 18th Rd., Miami, Fla. 33129

[21] Appl. No.: 270,071

[22] Filed: Nov. 14, 1988

[51] Int. Cl.$^4$ .............................................. B60D 1/06
[52] U.S. Cl. .................................................... 280/477
[58] Field of Search ..................... 280/477, 478.1, 508, 280/511

[56] References Cited

U.S. PATENT DOCUMENTS

| | | | |
|---|---|---|---|
| 3,420,549 | 1/1969 | Robinson | 280/477 |
| 3,773,356 | 11/1973 | Eichels et al. | 280/477 |
| 4,254,968 | 3/1981 | DelVecchio | 280/477 |
| 4,417,748 | 11/1983 | Dortch | 280/511 X |
| 4,657,275 | 4/1987 | Carroll | 280/511 X |

Primary Examiner—John A. Pekar
Attorney, Agent, or Firm—Malloy & Malloy

[57] ABSTRACT

A guide assembly of the type removably mounted in cooperative relation to a hitch ball secured to a vehicle or like structure in a conventional manner wherein the guide assembly, once in an operative position relative to the hitch ball, will serve to direct the distal free end of a coupling tongue into engagement with the hitch ball so as to facilitate coupling therebetween with a minimum effort exerted by the operator of the vehicle on which the hitch ball is mounted.

12 Claims, 3 Drawing Sheets

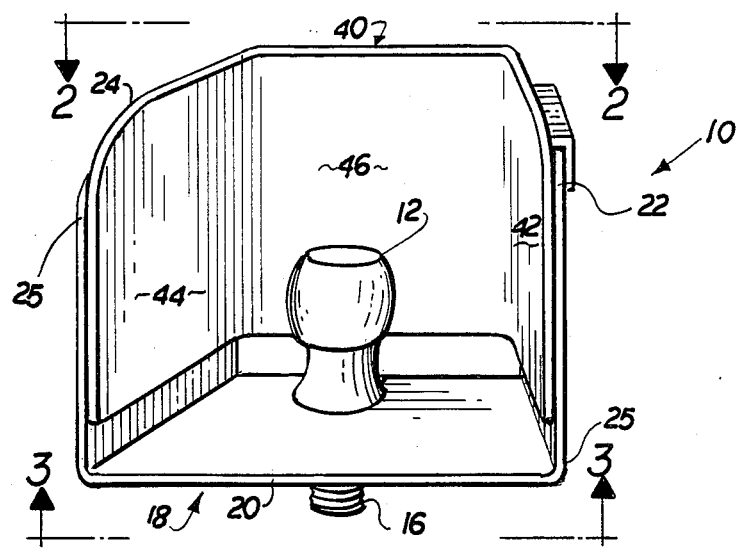
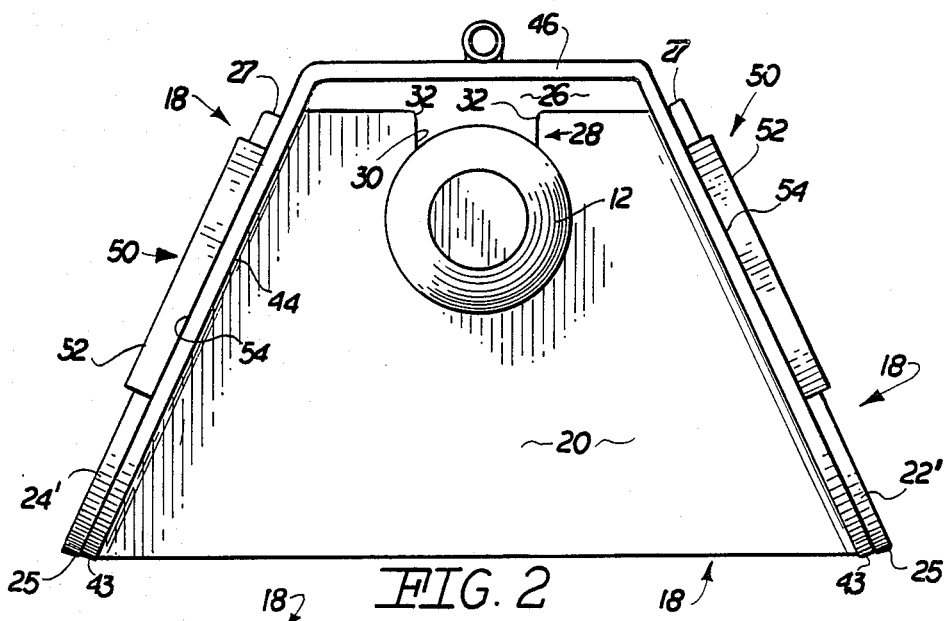
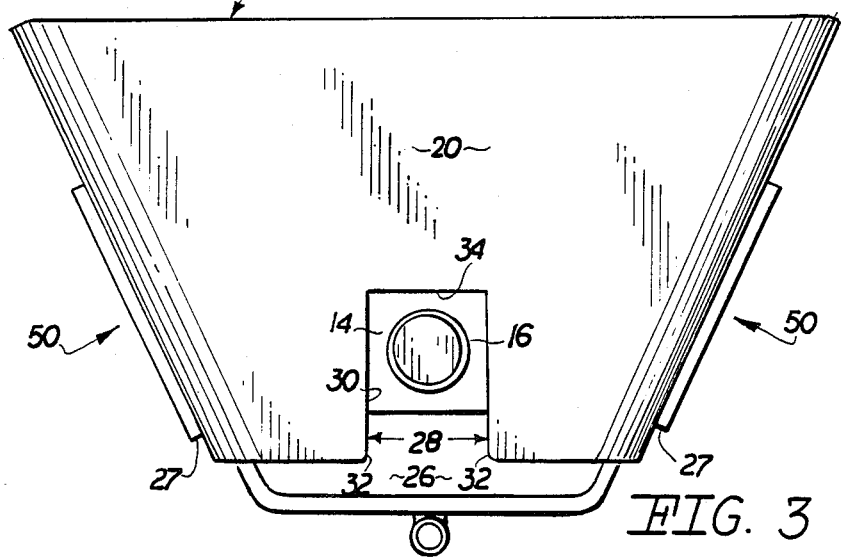

GUIDE ASSEMBLY FOR A TRAILER HITCH STRUCTURE

BACKGROUND OF THE INVENTION

1. Field of the Invention

This invention relates to a guide assembly capable of being removably secured to a conventional hitch ball and into an operative position such that a vehicle on which the hitch ball is mounted may be directed relative to the distal free end of a coupling tongue of a trailer and accomplish engagement between the distal end of the coupling tongue and the hitch ball without necessitating the operator of the vehicle exiting the vehicle or requiring direction from a second person located exterior of the vehicle.

2. Description of the Prior Art

It is common practice for an automobile or truck-type vehicle to tow a trailer through the use of a hitch ball mounted on a rear portion of the vehicle and a coupling tongue secured to or being a part of the towed trailer. In conventional practice, the hitch ball may be of varying sizes and is commonly found in the form of a sphere, ball-like structure frequently having lubricant placed over the exterior surface thereof and designed to fit within a cup-like free, distal end of a coupling tongue. This type of interconnection allows for relative movement of the coupling tongue and of course, the trailer to which it is attached such as when the vehicle turns corners or travels over relatively rough terrain.

However, it is frequently difficult to back a vehicle having a hitch ball into correct position relative to the free, distal, coupling end of the trailer hitch or coupling tongue. It is common practice to use at least two people; one to operate the vehicle and the other to be positioned exterior of the vehicle and give directions to the operator for proper positioning of the vehicle and accordingly, the hitch ball.

The prior art has attempted to solve the above-noted problem through the proposal of permanently mounted V-shaped ball guides to make it easier for the ball to come into correct position relative to the free end of the coupling tongue. However, these devices are generally permanently secured to the vehicle in cooperative association with the hitch ball which frequently is undesirable from the owner or operator of the vehicle. The prior art also includes devices which accomplish removal of portions of a ball guide assembly but, these devices may very well be considered to be generally overly complicated, or difficult and frequently unreliable to install in an operative position.

The following U.S. patents are representative of the prior art guide structures of the type set forth above.

Robinson, U.S. Pat. No. 3,420,549 discloses a trailer hitch guide and guard which discloses pivotally mounted guiding members secured to a support platform or base used to attach the hitch ball to the vehicle.

Eichels, U.S. Pat. No. 3,773,356 discloses a trailer hitch structure to guide the female part of the hitch to position over the male hitch ball so that that the female part will fall into place once the two are brought into relative association. A U-shaped guide member is fixedly secured to the stand at the level or top area of the hitch ball and the base is adjustable to accommodate coupling components of various sizes.

The patent to DelVecchio U.S. Pat. No. 4,254,968 discloses a removable ball guide attachment for a trailer hitch which is secured by threaded ball-type fasteners to the coupling tongue associated with the trailer or vehicle being towed. While appearing to be operative for its intended purpose and function, the means of attachment of the ball guide structure does not appear to be readily accomplishable without the use of tools and a significant amount of exertion on the part of the operator. Similarly, the patent to Dortch, Pat. No. 4,417,748 discloses a trailer swivel hitch guide for attachment on a bumper of a vehicle and received around a trailer hitch ball which itself is secured to the bumper. While apparently removable from its operative position, the attachment or mounting structure associated therewith again may very well take the utilization of tools and is very complicated and somewhat expensive.

The patent to Carroll, U.S. Pat. No. 4,657,275 discloses a self-aligning ball and socket-type hitch structure including an elevated ramp member pivotally attached to an extension member which in turn is slidably engaged with the base of the hitch so that the ramp member and extension may be readily removed once the ball and socket are engaged. The positioning and securement of the structure includes numerous relatively movable structural components securable into an operative position apparently only through the use of tools and, as set forth above, a significant amount of exertion by the operator.

In light of the development of the prior art as at least partially evidenced by the above-noted U.S. patents, there is still a need for a removable guide assembly which may be easily and quickly mounted in operative relation to a hitch ball on a vehicle in a manner which does not require conventional or specialized tools, significant exertion by the operator or any specialized knowledge of mechanics.

SUMMARY OF THE INVENTION

The present invention relates to a guide assembly of the type used to align, for coupling engagement, a hitch ball with a distal, coupling end of a trailer hitch or coupling tongue associated with a trailer or like vehicle or structure being towed.

More specifically, the subject guide assembly includes a base plate having a base portion and two upwardly extending side walls converging from a leading end to a trailing end towards one another. The trailing ends or edges of the side walls are left in a spaced-apart disposition relative to one another to form an open end portion of the base plate. In addition, a receiving means in the form of a receiving channel is integrally formed in the base portion of the base plate and this receiving channel has an open end disposed in direct communication with the open back portion of the base plate. Both the open back portion and the receiving channel are specifically dimensioned to allow passing therethrough and receipt respectively of the hitch ball such that the side walls of the base plate are disposed on opposite sides of the hitch ball when in its operative position. However, while operatively positioned, the disposition, dimension and configuration of the open back portion as well as the receiving channel are such as to very efficiently and easily accomplish removal or attachment of the base plate to the hitch ball in the aforementioned operative position.

The assembly of the present invention further includes a stop plate removably mounted on the base plate and disposed in at least partially surrounding relation to the hitch ball to define its operative position.

The stop plate includes an open bottom and two guide walls also angularly oriented in a converging relation from their leading or front, spaced-apart peripheral edges towards a closed back portion of the stop plate. Mounting means are provided to easily and quickly removably secure the side walls in overlapping, confronting relation to inner surfaces of the guide walls. Also on this position, the aforementioned closed back portion of the stop plate is disposed in effectively covering relation to the open-back portion of the base plate and behind the hitch ball. Therefore, when the stop plate is in its operative position to guide the free, distal coupling end of the coupling are into aligned relation with the hitch ball, the two guide walls of the stop plate are disposed on opposite sides of the hitch ball in substantially converging relation thereto and specifically in converging relation to the closed back portion of the guide plate. The back portion is disposed so as to effectively cover the open back portion of the base plate thereby blocking and preventing removal of the hitch ball from the base plate through the open back portion.

Mounting means secured to the guide walls of the stop plate will allow easy attachment and detachment of the guide plate relative to the base plate but are so positioned and structured to prevent lateral movement in either what may be referred to as a forward or rearward direction. The guide plate can only be "lifted" in a substantially upward direction from the base plate when the guide plate and base plate are initially in their operative position.

Once the guide plate is removed, the base plate can just as easily be removed by pulling the base plate forwardly such that an under portion of the hitch ball slides from the receiving channel through the open end thereof and through the open back portion of the base plate.

The invention accordingly comprises the features of construction, a combination of elements and an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a perspective view of the guide assembly in its assembled, operative position.

FIG. 2 is a top view along line 2—2 of FIG. 1.

FIG. 3 is a bottom view along line 3—3 of FIG. 1.

Like reference numerals refer to like parts throughout the several views of the drawings.

DETAILED DESCRIPTION OF THE PREFERRED EMBODIMENT

Figure 4:
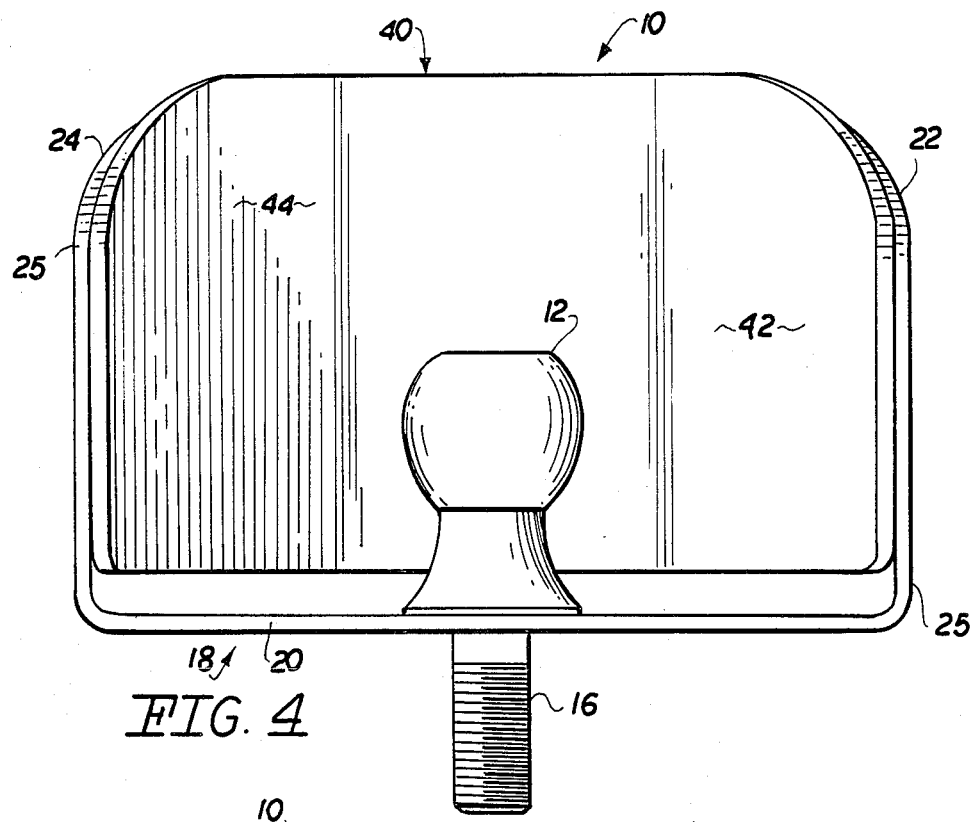
FIG. 4 is a front plan view of the embodiment of FIG. 1.
Figure 5:
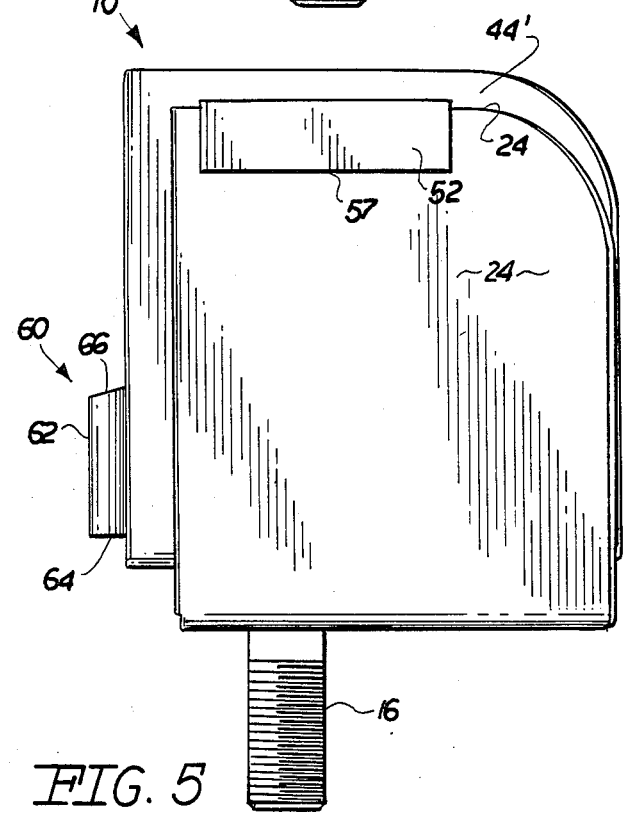
FIG. 5 is a side view of the embodiment of FIG. 1.

The present invention is directed towards a guide assembly generally indicated as 10 and designed to be used in combination with a hitch ball 12 of conventional structure and of any one of a plurality of different sizes. The hitch ball 12 is mounted on an elongated externally threaded mounting stem 16 of the type secured to a rear portion of a towing vehicle. Obviously, other means of securing the hitch ball 12 to the vehicle could be utilized and still remain within the scope of the present invention.

The guide assembly includes a base plate generally indicated as 18 having a base portion 20 and two side walls 22 and 24 secured to and extending upwardly or outwardly from the base portion 20 in a common direction. Further, each of the side walls 22 and 24 are angularly oriented relative to one another so as to substantially converge from a leading edge 25 of each side wall 22 and 24 to a trailing edge thereof as at 27. The trailing edges 27 are disposed in spaced-apart relation to one another so as to define what may be referred to as an open back portion 26. The spacing between the trailing edges 27 of the side walls 22 and 24 is sufficient to allow passage therebetween of the hitch ball 12. More specifically, the base portion 20 further includes a receiving means 28 for receiving the hitch ball 12 and more specifically an under portion 14 thereof into operative position relative to the base portion 20 of the base plate 18. More specifically, the receiving means 28 is defined by a substantially elongated receiving channel 30 having an open end 32 and a closed end 34. The transverse dimension and the overall configuration of the receiving channel 30 and the transverse dimension of the open end 32 thereof is such as to allow passage and receiving engagement of the under portion 14 of the hitch ball 12 therein. Once placed therein, the under portion 14 is preferably disposed in confronting relation to the closed end 34. By virtue of the cooperative dimension and configurations of the receiving channel 30 and the under portion 14 of hitch ball 12, it is seen that relative rotational movement between the base portion 20 and the hitch ball 12 is prevented. Yet, the hitch ball 12 is snuggly and securely received within the receiving channel 30 defining the receiving means 28. Also, it is readily apparent that attachment and detachment of the base plate 18 from its operative position as shown in the accompanying figure is readily accomplished without the use of conventional or specialized hand tools or any unusual exertion by the part of the operator.

The guide assembly of the present invention further includes a stop plate 40 including two angularly oriented guide walls 42 and 44 oriented in converging relation from a leading edge 43 towards a closed back portion 44. As clearly seen, the guide walls 42 and 44 are disposed, when in their operative position, in parallel and confronting relation to the side walls 22 and 24 respectively and accordingly, have substantially the same angular orientation as pictured. Collectively, the guide walls 42 and 44 and the closed back portion 46 are disposed in substantially surrounding relation to the hitch ball 12. Also, and more importantly, the angular orientation of the guide walls 42 and 44 converge substantially about the hitch ball 12 so as to effectively guide and direct the free coupling end of a coupling tongue or trailer hitch into engagement with the hitch ball 12 so as to accomplish easy interconnection therebetween. Also, the closed back portion 46 substantially overlays or covers the open back portion 26 of the base plate 18. By virtue of the placement of the closed back portion 46 relative to the hitch ball 12 and also due to the fact that the guide walls 42 and 44 are secured interiorly of and in confronting relation to the inner surface of the side walls 22 and 24 respectively by virtue of mounting means 50, the guide assembly including the guide plate 18 and the stop plate 40 cannot be removed from its operative position in cooperative relation to the hitch ball 12.

The mounting means 50 includes two outwardly and downwardly extending mounting flanges 52 fixedly secured to an outer surface portion of each of the side walls 42 and 44 as at 54 and spaced from the respective outer surface of the side wall 22 and 24 a sufficient distance to allow passing and/or receipt of the upper periphery 22' and 24' into the spacing between the respective mounting flange 52 and the outer surface as clearly shown in the accompanying figures.

Figure 6:
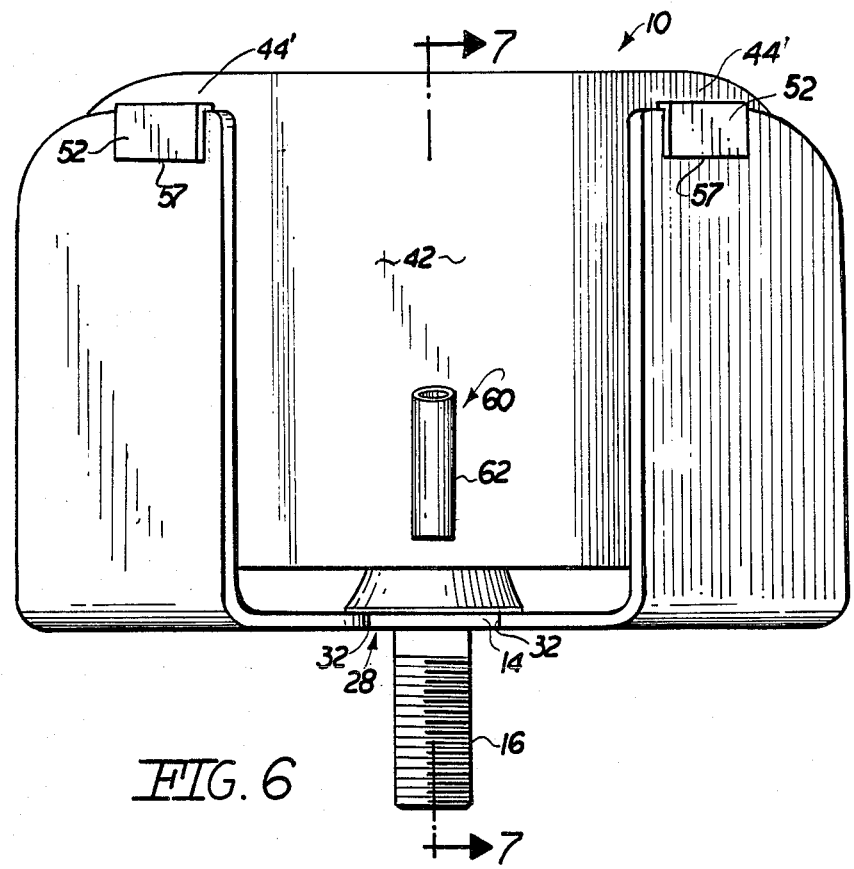
FIG. 6 is a rear view of the embodiment of FIG. 1.
Figure 7:
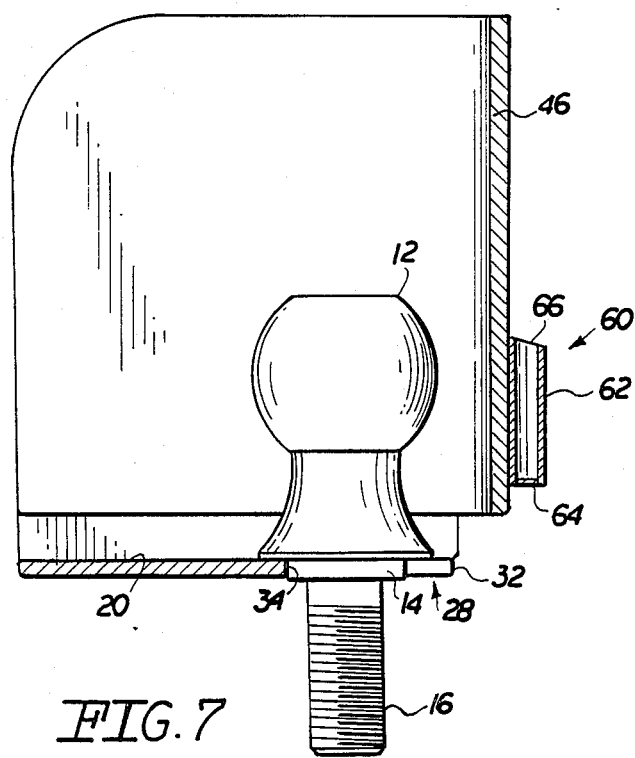
FIG. 7 is a sectional view along line 7—7 of FIG. 6.

As best shown in FIG. 6, each of the mounting flanges 52 has a free end 57 itself being spaced from the corresponding exterior surface of the corresponding side wall such that the aforementioned upper periphery 24' may easily pass therethrough. Therefore, the mounting flanges 52 have a substantially L-shaped configuration since they are fixedly or integrally secured at their upper end to the outer surface as at 44' of a corresponding guide wall.

Other features of the present invention include a socket or receiving member generally indicated as 60 in the form of an elongated substantially hollow tube 62 having an at least partially closed end as at 64 and an open outer end as at 66. Such receiving socket or tube is provided so as to place therein an elongated stem for purposes of guiding and thereby aiding the operator of the vehicle in proper placement of the entire guide assembly 10.

Now that the invention has been described, what is claimed is:

1. A guide assembly for use in combination with a hitch ball on a vehicle and structured to guide a coupling tongue into mounting connection with the hitch ball, said assembly comprising:
   a. a base plate removably mountable in adjacent, at least partially surrounding relation to the hitch ball,
   b. said base plate comprising a base portion and spaced-apart side walls secured to said base portion and extending outwardly therefrom in a common direction,
   c. said side walls disposed at an angular orientation to one another and converging towards one another from leading edges thereof towards spaced-apart trailing edges thereof,
   d. said trailing edges defining opposite peripheral edges of an opening back portion of said base plate, said open back portion being of sufficient dimension and configuration to allow passage therethrough of the hitch ball,
   e. a receiving means formed in said base portion and disposed in communicating relation to said open back portion and dimensioned for slidably receiving a portion of the hitch ball therein,
   f. a stop plate comprising two angularly oriented guide walls disposed in converging relation to one another from an open front portion to an inner-connecting back portion, said back portion positioned rearwardly of the hitch ball in overlying relation to said open back portion of said base plate, and
   g. mounting means secured to said stop plate and disposed and structured for removable connection of said stop plate to said base plate.

2. An assembly as in claim 1 wherein said receiving means comprises a channel integrally formed in said base portion and including an open outer end disposed in communicating relation to said open back portion of said base plate.

3. An assembly as in claim 2 wherein said channel further includes a closed inner end of sufficient dimension to receive an under portion of the hitch ball to pass therein through said open end and into confronting engagement with said closed end.

4. An assembly as in claim 3 wherein said channel is dimensioned and configured to receive and slidably engage the under portion of the hitch ball and prevent rotational movement of said base plate relative to the hitch ball.

5. An assembly as in claim 1 wherein said back portion is disposed between the hitch ball and said open back portion of said base plate and in blocking relation to removal of the hitch ball from said base plate through said open back portion.

6. An assembly as in claim 5 wherein said guide walls and back portion are collectively disposed in space and in at least partially surrounding relation to the hitch ball, said guide walls cooperatively converging relative to the hitch ball and thereby disposed to direct the coupling tongue into engagement with the hitch ball.

7. An assembly as in claim 1 wherein said mounting means comprises at least one gripping flange secured to an outer surface of one of said guide walls and extending outwardly and downwardly therefrom and in overlying, removable engagement with an upper periphery of a corresponding one of said side walls.

8. An assembly as in claim 7 wherein said one gripping flange comprises a substantially L-shaped configuration.

9. An assembly as in claim 8 wherein said one gripping flange comprises a free distal end spaced outwardly from said outer surface of said one guide wall a sufficient distance to allow passage between said outer surface and said gripping flange of said periphery of said side wall.

10. An assembly as in claim 1 wherein said mounting means comprises two gripping flanges each secured to an outer surface of a different one of said guide walls and extending outwardly and downwardly therefrom and in overlying, removable engagement with an upper periphery of a corresponding one of said side walls.

11. An assembly as in claim 10 wherein each of said gripping flanges comprises a substantially L-shaped configuration.

12. An assembly as in claim 11 wherein each of said gripping flanges comprises a free distal end spaced outwardly from said outer surface of said one guide wall on which it is mounted a sufficient distance to allow passing of said periphery of a corresponding one of said side walls therebetween.

* * * * *